| United States Patent Office | 3,773,899 |
|---|---|
| | Patented Nov. 20, 1973 |

3,773,899
MANUFACTURE OF SILICON CARBIDE
Thomas John Lewis, Bishops Stortford, England, assignor to National Research Development Corporation, London, England
No Drawing. Filed June 14, 1971, Ser. No. 153,017
Claims priority, application Great Britain, June 12, 1970, 28,492/70
Int. Cl. C01b 31/36; B01j 17/32
U.S. Cl. 423—346                     16 Claims

ABSTRACT OF THE DISCLOSURE

A process for the production of silicon carbide whiskers comprising maintaining a silicon-containing vapour and a carbon-containing vapour at a temperature of at least 1,100° C. in a reaction zone in the presence of a substrate whereby silicon carbide whiskers are deposited upon the substrate, and is characterised by providing a super-saturated concentration of an iron-containing vapour in the reaction zone so that whisker growth may continue even when the substrate is substantially entirely coated with whiskers giving consequent increase in yield and process efficiency.

---

The invention relates to improvements in the manufacture of silicon carbide in the form of elongated single crystal fibres known as whiskers. The term whisker is generally applied to any single-crystal fibre having a thickness less than about 0.1 mm. and a length to thickness ratio of at least 10.

Silicon carbide whiskers have been produced by a variety of high temperature gas-phase reactions in which a silicon-containing vapour and a carbon-containing vapour have been heated in a furnace under suitable conditions to yield silicon carbide which deposits in the form of whiskers upon a suitable substrate in the furnace. Silicon has a relatively low vapour pressure and in order to obtain a silicon concentration sufficient to achieve useful yields of whiskers from a gas-phase reaction it has been necessary to provide a silicon-containing vapour in the form of a silicon compound having a higher vapour pressure. Typically, suitable silicon-containing vapours have been produced by evaporating silicon monoxide from an equimolar mixture of silicon and silica (U.S. Pat. 3,394,991) and by transport of silicon into the vapour phase with chlorine in the form of suitable chlorides (as described in copending U.S. application 727,160); direct pyrolysis of vapours containing both silicon and carbon, such as alkyl silanes, have in practice given lower yields of whiskers.

In silicon carbide whisker-forming processes it has been found advantageous to provide, adjacent the reaction zone in which the silicon and the carbon-containing vapours interact, a substrate conducive to the deposition of whiskers. Throughout this specification the term substrate is used to refer to a surface adjacent a whisker forming reaction zone and upon which it is intended that silicon carbide whiskers should be deposited. Although the substrate may be particulate solids such as dust, silicon carbide particles, whisker fragments and other materials, preferred substrates are refractory materials such as alumina, silicon nitride, silicon carbide, mullite and carbon generally in sheet or tube form to present a useful surface area for deposition. Although whiskers may be deposited upon other substrates, the aforementioned preferred materials appear to offer the greatest number of nucleating sites upon which whiskers may form and therefore produce good yields of whiskers. The whisker yields are, however, limited by the availability of substrate surface and when this surface is substantially covered with a whisker deposit further nucleation and growth of whiskers ceases to any significant extent. To maximise whisker yields it is clearly desirable to utilise as large a proportion as possible of the furnace hot zone for whisker deposition rather than be limited to a restricted substrate surface area. It has been proposed (British Pat. 998,166) to attain this end by providing a permeable refractory substrate of porous or fibrous form occupying at least the major part of the furnace hot zone so that whiskers are deposited on the substrate at nucleating sites well distributed within the reaction zone. This proposal has had little commercial success, possibly because of the difficulties inherent in separating the whisker product from the interstices of the substrate, and the present invention aims to provide an alternative process by which nucleation and deposition of whiskers may be achieved throughout at least a substantial proportion of the furnace hot, zone largely irrespective of the area of whisker-growing substrate available.

According to the present invention, a process for the production of silicon carbide whiskers comprises maintaining silicon-containing vapour and a carbon-containing vapour at a temperature of at least 1100° C. in a reaction zone in the presence of a substrate whereby silicon carbide whiskers are deposited upon the substrate, characterised by providing a supersaturated concentration of an iron-containing vapour in the reaction zone. The presence of the iron-containing vapour causes the deposition of whiskers to be prolonged after the substrate is substantially entirely covered with whiskers.

Preferred reaction temperatures are preferably between about 1200° C. and 1400° C. and generally around 1350° C.

The mechanism by which processes in accordance with the invention occur is not completely understood, but it appears that the supersaturated iron-containing vapour co-precipitates with silicon and carbon to form droplets of iron-silicon-carbon alloy and provides potential whisker nucleation sites distributed through the volume of the reaction zone which under appropriate process conditions can provide whisker growth sites at positions additional to the surface of the substrate. The important practical result is that deposition and growth of whiskers continues even when the available substrate nucleation sites are saturated because the supersaturated iron-containing vapour reacts to provide new sites possibly upon the surface of the previously deposited whiskers or upon other nucleating materials such as dust existing in the furnace. This permits a thick mass of whiskers to form in the reaction zone in contrast to the relatively thin layer of whiskers which is all that is normally obtained otherwise. The mode of reaction involved in silicon carbide whisker nucleation by iron in accordance with the invention is not completely resolved but can be explained in terms of an extension of the vapour-liquid-solid (V.L.S.) mechanism first propounded by Wagner and Ellis (Trans. Met. Sock A.I.M.E., 233, 1053 (1965)). I now believe that under suitable reaction conditions a liquid iron-silicon-carbon alloy deposits within the reaction zone and that silicon carbide, formed from the vapour phase reactants, crystallises within the liquid alloy and continues to grow substantially unidirectionally away from the point of nucleation, the tip of the growing whisker carrying with it some iron-silicon-carbon alloy in which further crystallisation of silicon carbide takes place to further extend the whisker. This is supported by analysis of many of the whiskers produced which reveals that the whisker tip carries an accumulation of silicon-iron-carbon alloy. Although a liquid iron-silicon-carbon alloy is clearly essential to this growth mechanism, it seems from phase-diagram studies of the Si-C-Fe system that particular iron-silicon-carbon alloys may also inhibit or terminate whisker growth by rejecting carbon. These inhibiting silicon-iron-carbon alloys appear to be silicon-rich and it is therefore important to avoid excessive concentrations of silicon-containing gases over carbon containing gases in regions where whisker growth is taking place. This may be achieved by maintaining the amount of carbon containing vapour to silicon containing vapour in the reaction zone in excess of an equivalent amount.

Although I have not identified a specific upper limit to the useful concentration of iron-containing vapour in the reaction zone it appears undesirable to have concentrations of iron-containing vapour giving an iron proportion in the reaction zone of more than 5% (and generally more than 2%) by weight of the total weight of vapour-phase silicon and carbon in the reaction zone. Iron-containing vapour in excess of these proportions tends to precipitate liquid iron in an uncontrolled manner and submerge or "blanket" potential whisker growth sites and can therefore reduce whisker yields.

For useful yield enhancement, however, it is unlikely that the concentration of iron in vapour phase in the reaction zone can be allowed to fall below a partial pressure of $10^{-6}$ atmosphere (measured at 1350° C.) and is preferably $10^{-5}$ atmosphere (equivalent to a proportion of about 1% by weight of the total of vapour-phase silicon and iron in the reaction zone at 1350° C.). Analysis of silicon carbide whiskers produced indicates an iron content of about 1% which supports the desirability of this proportion in the initial reactant mixture.

In accordance with an important aspect of the invention the source of iron-containing vapour is positioned remote from the substrate, and preferably remote from the main reaction zone. Additionally, the flux of iron-containing vapour to the reaction zone from the iron source may be optimised by maintaining the source of iron-containing vapour, and hence supplying the iron-containing vapour itself, at a temperature somewhat below the temperature of the reaction zone. In these ways, the supply of iron-containing vapour may be regulated to approximate to the consumption of iron in whisker formation whilst an appropriate supersaturated concentration of iron is maintained in the reaction zone.

I am aware that it has been proposed in Dutch patent application 6617544 (corresponding to British Pat. 1,213,156 published Nov. 18, 1970) to distribute solid-phase iron upon the surface of a whisker growing substrate. I make no claim to the use of such a technique which I consider suffers from the aforementioned disadvantage of yielding whisker growth restricted to a layer upon the substrate. The Dutch patent application does not contemplate the use of iron in the vapour phase to promote whisker growth and is wholly concerned with improving the yield of whiskers on a substrate surface layer. Although it is conceivable that some of the solid phase iron might under favourable circumstances become partially vapourised in the processes described, such vapour cannot be thermodynamically supersaturated and therefore could not take part in the co-precipitation mechanism involved in nucleating whiskers in accordance with the invention. Additionally, of course, any iron vapour produced would be localised to the substrate region rather than dispersed through the reaction zone.

The enhancement of yield attainable from the use of an iron-containing vapour in accordance with the present invention appears to be applicable to all the processes for silicon carbide whisker formation described in the literature, but is preferably applied to processes in which chlorine is used to transport the silicon and carbon reactants. As more fully described in our U.S. application Ser. No. 727,160 filed May 7, 1968, solid-phase silicon and solid-phase carbon are heated within a furnace reaction zone in an atmosphere of hydrogen and a minor proportion (up to 10% by volume) of chlorine, whereby the chlorine transports the silicon and carbon as volatile chlorides into the vapour phase for the whisker forming reaction. It is particularly convenient, in accordance with a further aspect of the present invention, to introduce an iron-containing vapour into the processes described in U.S. Ser. No. 727,160, generally in the form of an iron chloride vapour. Alternatively, the iron-containing vapour may be produced by passing into the heated reaction zone finely divided solid iron, an iron-containing compound, or a solution or dispersion of an iron-compound which yields the required concentration of iron-containing vapour at the temperature of the reaction zone. Suitable iron compounds include other iron halides and volatile compounds such as iron carbonyl which are reduced in the reaction zone.

The iron-containing vapour may be introduced into the reaction zone by any convenient method which is susceptible to control of the concentration of the iron-containing vapour produced. For example, the iron-containing vapour may be entrained within a suitable carrier gas or gas mixture whose temperature is controlled and passed with the gas stream into the reaction zone. This procedure is particularly convenient if one or more of the heated reactant gases are pre-heated and passed over an iron source in their passage to the reaction zone. Alternatively, carrier gases such as chlorine or hydrogen chloride may be passed over a heated particulate iron source.

The presence of metallic iron in a hydrogen/chloride atmosphere results in $FeCl_2$ vapour being formed which on diffusing into the region of whisker growth undergoes the co-precipitation described above. If this technique is used, it has been found advantageous for the temperature of the metallic iron to be kept below that of the reaction zone. The actual concentration of gaseous $FeCl_2$ vapour equivalent to a supersaturated system with respect to iron will depend upon the concentration of the other gases in the system, particularly hydrogen chloride. Assuming that the bulk gas concentration in the reaction zone is 4 molecular percent in hydrogen at 1400° C., the vapour pressure of $FeCl_2$ gas needs to be at least $10^{-3}$ atmospheres and normally between $10^{-3}$ and $10^{-2}$ atmospheres. Some preliminary experiments normally will be necessary to optimise the whisker yield and can be illustrated by the following typical example.

Solid finely-divided silicon (1 g.) and solid finely-divided carbon (1 g.) were placed in a reaction zone extending for about 2 cm. along a tube furnace lined with ceramic material and heated to about 1200° C. in an atmosphere of hydrogen containing 1% by volume of chlorine. In a series of tests finely-divided iron (1 g.) was placed in the furnace at varying distances from the reaction zone and consequently exposed to temperatures progressively lower than those of the reaction zone, the temperature difference, of course, increasing with increase in separation between the reaction zone and the iron.

Under these conditions, the chlorine component of the atmosphere reacted with the solid-iron to form iron chloride vapour which migrated against the temperature gradient and entered the reaction zone. The results were as follows:

| Separation of iron source from reaction zone (cm.) | Temperature difference between iron source and reaction zone (° C.) | Yield of silicon carbide whiskers (mg.) |
| --- | --- | --- |
| 4 | 20 | 148 |
| 6 | 32 | 260 |
| 8 | 52 | 380 |
| 11.5 | 108 | 340 |

The results indicate that, for the particular process described, yields of whiskers are maximised by spacing the source of iron-containing vapour about 8 cm. from the reaction zone at a temperature approximately 60° C. lower than that in the reaction zone. Under these conditions whisker nucleation was achieved substantially throughout the volume of reaction zone with further whiskers depositing upon previously deposited whiskers and the whisker deposit was not restricted to a mere coating of the substrate (the furnace walls) surrounding the reaction zone. A comparative experiment in which a similar quantity of finely-divided solid iron was placed upon the substrate surrounding the reaction zone (by analogy with the proposals of Dutch patent application 6617544) gave a very low whisker yield of 114 mg. Furthermore, the whisker deposit was observed to be substantially wholly restricted to a whisker coating on the substrate surface.

As a general rule, the desirable temperature difference between the reaction zone and the iron source is between 30° to 150° C. and more commonly 50°–100° C.

Various forms of furnace may be adapted to produce silicon carbide whiskers by processes in accordance with the invention, but conveniently the apparatus is that described in our British Pat. No. 1,121,294 or our co-pending U.S. applications Ser. Nos. 716,937 and 727,160 suitably modified to provide the source of nucleating iron-vapour. Such modification may be readily achieved by passing a supply of iron-containing vapour, pre-heated to the appropriate temperature, through an inlet tube in the apparatus and thereby directly into the heated reaction zone. Alternatively, the iron may be supplied as an iron compound in a solution or a dispersion which is volatilsed en route to the reaction zone; or as a particulate solid (optionally fed through a preheater) to yield vapour at the appropriate temperature.

Although not the preferred procedure, it may be possible to find regions within a particular furnace which are considerably cooler and sufficiently distant from the main reacting hot zone for an iron source to be positioned there and evaporate to provide a suitable iron-containing vapour for the whisker forming reaction in the hot zone. Some limited success has been achieved by placing a coating of iron on the insulating firebrick of the furnace described in U.S. application Ser. No. 727,160. In this furnace the temperature difference between the hottest parts of the reaction zone near the carbon heating electrode and the firebrick lining is of the order of 100° C. and the separation between the firebrick surface and the substrate provided for whisker growth (normally a carbon plate) is approximately 10 cm.

The major advantage of processes in accordance with the present invention has been ascribed herein to the facility with which whisker growth may be continued within a reaction zone even when the nucleating substrate is substantially entirely coated with whiskers. To a large extent, therefore, yields are independent of the available substrate area. However, since successful nucleating and growth of whiskers is achieved within the reaction zone upon, for example, dust and particles of silicon carbide remote from any substrate, it will be apparent to those skilled in whisker growth processes that the vapour phase iron-assisted silicon carbide growth processes of the present invention may be carried out in the complete absence of a specific whisker nucleating substrate of the generally accepted refractory materials.

I claim:

1. In a process for the production of silicon carbide whiskers comprising maintaining a vapor phase containing chlorides of silicon and gaseous hydrocarbons at a temperature of at least 1100° C. in a reaction zone and in the presence of a substrate, whereby silicon carbide whiskers are deposited on the substrate, the improvement comprising providing, in the reaction zone during the deposition of whiskers, gaseous ferrous chloride generated from a source of iron remote from, and maintained at a lower temperature than, the substrate in a concentration greater than the equilibrium concentration of gaseous ferrous chloride in the presence of solid elemental iron.

2. A process according to claim 1 wherein the gaseous ferrous chloride is supplied to the reaction zone at a rate substantially equal to the rate of consumption of iron in the whisker-forming reaction.

3. A process according to claim 1 wherein the supply of gaseous ferrous chloride is produced by passing a stream of a reactant in the whisker forming process over a heated, particulate iron source immediately prior to the introduction of the reactant stream into the reaction zone.

4. A process according to claim 1 wherein the supply of gaseous ferrous chloride is produced by passing a stream of chlorine or hydrogen chloride gas over a heated, particulate iron source.

5. A process according to claim 3 in which the iron-containing source is heated at a temperature between about 30° C. and 150° C. below the temperature of the reaction zone whereby gaseous ferrous chloride is transported to the reaction zone against a temperature gradient to maintain the desired supersaturated concentration.

6. A process according to claim 5 wherein the temperature of the iron source is 50°–100° C. below the temperature of the reaction zone.

7. A process according to claim 1 wherein the concentration of gaseous ferrous chloride is equivalent to a concentration of iron of up to 5% by weight of the total weight of silicon and carbon in the vapor phase within the reaction zone.

8. A process according to claim 7 wherein the concentration of gaseous ferrous chloride is up to about 2% by weight of the total weight of silicon and carbon in the vapor phase in the reaction zone.

9. A process according to claim 1 wherein the concentration of gaseous ferrous chloride is equivalent to a partial pressure of iron of at least $10^{-6}$ atmosphere (measured at 1,350° C.).

10. A process according to claim 9 and in which the partial pressure of iron is at least $10^{-5}$ atmosphere (measured at 1,350° C.).

11. A process according to claim 1 in which the temperature is maintained between 1,200° C. and 1,400° C.

12. A process according to claim 11 in which the temperature is about 1,350° C.

13. A process according to claim 1 in which the proportion of silicon to carbon in the vapor phase within the reaction zone is equal to or less than equimolar.

14. A process according to claim 1 in which the silicon-containing vapour and the carbon-containing vapor are provided in the reaction zone by heating solid elemental silicon and solid-phase carbon in the reaction zone in the presence of hydrogen and a minor proportion of chlorine.

15. In a process for producing silicon carbide whiskers comprising maintaining, in a reaction zone, at a temperature of at least 1100° C., a vapor phase containing chlorides of silicon and gaseous hydrocarbons and depositing on a substrate silicon carbide whiskers, the improvement of increasing the yield of silicon carbide whiskers comprising providing, to the reaction zone simultaneously during the deposition of silicon carbide whiskers gaseous, ferrous chloride from a source of iron remote from the substrate and at a temperature of about 30 to 150° C. lower than the temperature of the reaction zone, and transported to the reaction zone against a temperature gradient to maintain the desired supersaturated concentration, the ferrous chloride present in a concentration equivalent to a partial pressure of iron of at least $10^{-6}$ atmosphere measured at 1350° C., depositing silicon carbide whiskers on the substrate and then depositing whiskers upon previously deposited whiskers.

16. A process according to claim 15 wherein the substrate area adjacent the whisker forming reaction zone is a refractory material selected from the group consisting of alumina, silicon nitride, silicon carbide, mullite and carbon.

References Cited
UNITED STATES PATENTS

| | | | |
|---|---|---|---|
| 3,433,725 | 3/1969 | Hough et al. | 23—208 A X |

FOREIGN PATENTS

| | | | |
|---|---|---|---|
| 1,213,867 | 11/1970 | Great Britain | 23—208 A |
| 1,563,415 | 3/1969 | France | 23—208 A |

MILTON WEISSMAN, Primary Examiner

UNITED STATES PATENT OFFICE
CERTIFICATE OF CORRECTION

Patent No. 3,773,899     Dated November 20, 1973

Inventor(s) Thomas John Lewis

It is certified that error appears in the above-identified patent and that said Letters Patent are hereby corrected as shown below:

Claim 8, line 2, delete "gaseous ferrous chloride"

and insert --iron--

Signed and sealed this 23rd day of July 1974.

(SEAL)
Attest:

McCOY M. GIBSON, JR.          C. MARSHALL DANN
Attesting Officer             Commissioner of Patents